Oct. 13, 1942.  W. W. BOES  2,298,339
FILM WINDER
Filed Oct. 2, 1940   2 Sheets-Sheet 1
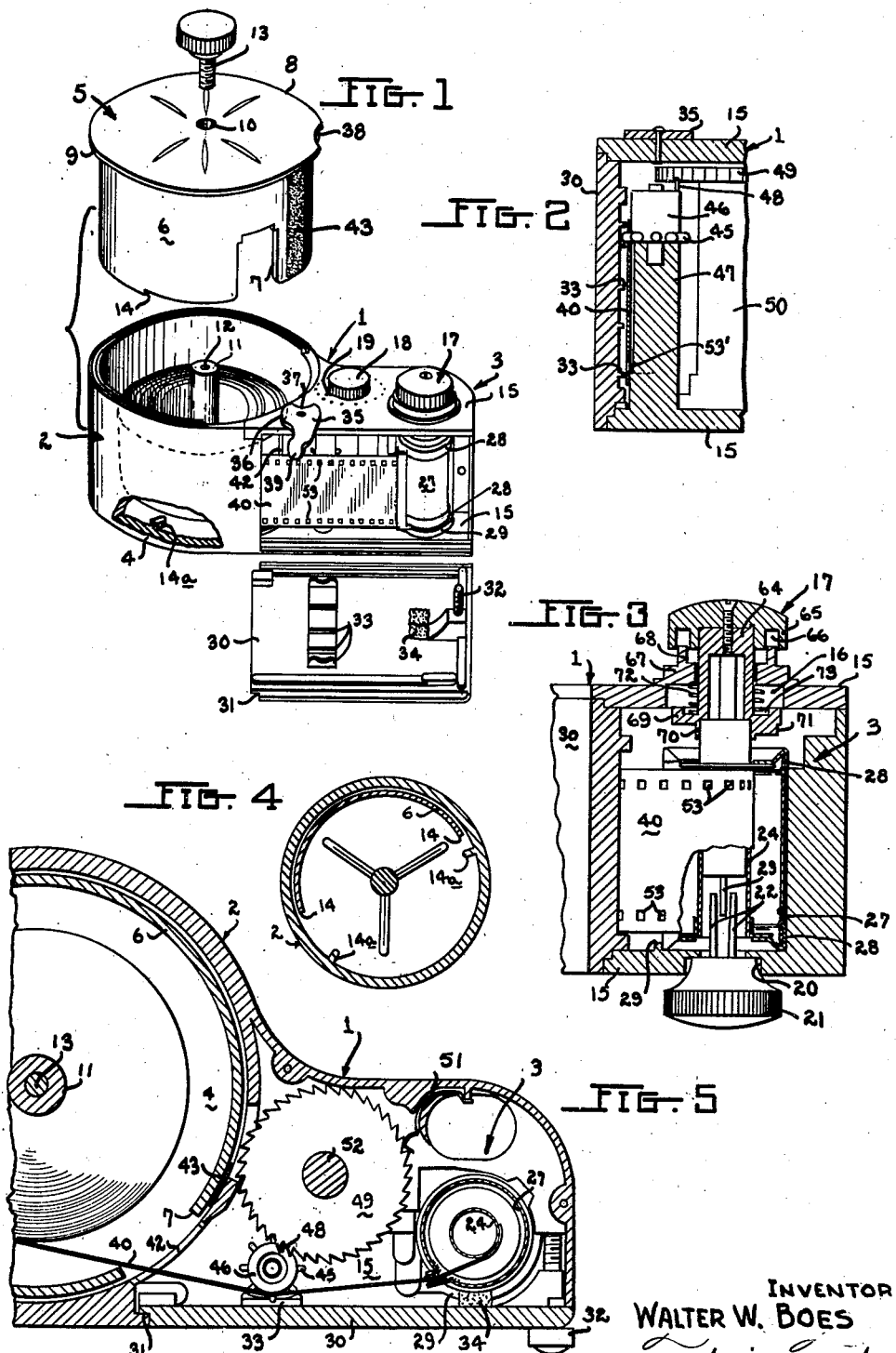
INVENTOR
WALTER W. BOES
BY
ATTORNEYS Oct. 13, 1942.                W. W. BOES                2,298,339
                              FILM WINDER
                          Filed Oct. 2, 1940              2 Sheets-Sheet 2

INVENTOR
WALTER W. BOES

Patented Oct. 13, 1942

2,298,339

UNITED STATES PATENT OFFICE 2,298,339

FILM WINDER

Walter W. Boes, Dayton, Ohio

Application October 2, 1940, Serial No. 359,419

12 Claims. (Cl. 242—55)

The present invention relates to apparatus for dispensing photographic ribbon film.

When motion picture film is purchased from the camera shops it is usually wound on spools for use in standardized film camera cassettes or magazines. The spooling of the film must be done in specially equipped dark rooms in the factories and after being loaded with the film the spools are enveloped in tinfoil or other like opaque material and placed in separate cartons. This preparation of the film is costly and in order to avoid this expense it has been customary to provide a film dispenser or winder available to the retail stores, the arrangement being such that the stores may buy film in bulk and transfer the film in as many exposure lengths as desired to a customer's cassette or magazine. These winders after being loaded with bulk film may be operated in daylight, thus saving the expense of a dark room and the cost of magazine loading is still further reduced by being able to load the cartridge with only as many potential exposures as the customer desires.

In the use of these film winders certain disadvantages have been encountered, the main difficulty being the fogging of limited lengths of film when the cover of the winder is opened to insert the empty cassette for loading or to remove the loaded cassette. This fogging effect is particularly noticeable when large openings or slots are provided at the housing which contains the film supply roll and also at the cassette in order to permit the film to be unwound from the supply roll and to be wound on the spool in the cassette or cartridge without being scratched. It will be understood that when the cover of the housing is removed in order either to insert or remove the cassette, light may enter the housing and destroy the effectiveness of those lengths of film exposed to the light and contained either in the supply roll or the cassette.

It has been proposed heretofore to provide an interlock between the housing cover and the cassette, this interlocking feature operating in such a way that the cover cannot be removed as long as the opening or slot in the cassette is exposed to light. In practice it has been found that this feature gives absolutely no light protection to the film contained in the film supply compartment so that notwithstanding the fact that the slot in the cassette must be closed before the cover of the housing can be removed considerable damage by fogging can still be done to the film supply roll. In order to prevent light from entering the film supply compartment, it has also been proposed to provide a light trap at the position where the film leaves the compartment, but inasmuch as this trap consists of velvet pads which bear against the film so tight as to exclude light, there is danger of scratching the film and in any case considerable contact friction is developed at the film which is not desirable.

The primary object of the present invention is to provide an improved film winder which will have none of the defects discussed hereinbefore.

Another object is to provide a winder having a large film supply compartment and a cassette receiving compartment together with a cover for the insertion and withdrawal of the cassette, the elements being so arranged that when the cover is temporarily removed positively no light will be admitted not only to the cassette but also to the supply roll compartment. In other words, the cover will be interlocked with both the opening in the cassette and the opening in the film supply roll compartment and the cover cannot be removed until both of these openings are effectively closed.

Still another object is to provide an improved film winder of the type in which a large slot is provided in the film supply roll compartment for the ready movement therethrough of the film during the winding operation, the slot being closed before the cover of the housing can be removed by a simple key attachment secured to the film winder housing.

Another object is to provide a winder of the type referred to in which the feature for interlocking the openings in the film supply compartment and the cassette is contained entirely within the housing and is automatically operative so that when one of these openings is closed the other of the openings is also closed. This feature is combined with the feature of interlocking the opening in the film supply compartment and the cover of the housing so that all three elements are interlocked, namely, the openings in the film supply compartment and in the cassette, also the cover of the housing. Thus the cover cannot be removed until both of these openings are closed.

The film winder which will be described presently can accommodate practically all of the standard forms of cassettes and many of the foreign make, such as German, and including those which have rotatable shutters. The winder may also be employed in connection with cassettes which do not have shutters but simply have velvet padded light traps, and in addition those cassettes which have film-receiving openings normally closed by a spring pressed tongue. The padded light traps do not require opening and closing operations during the loading of the cassette but those with the rotatable and spring pressed shutters do require these operations in order to present the film to the spool and to exclude light from the cassette when loaded.

Accordingly, another feature of the invention provides an interlocking mechanism between the cover of the housing and the movement of the spring pressed tongue of the last mentioned form of cassette so that the tongue is permitted to close off the opening in the cassette when the cover is removed and the tongue is caused to be withdrawn from the opening to present the interior of the cassette to the film when the cover is positioned in place.

Other objects and features will be apparent as the specification is perused in connection with the accompanying drawings in which, Figure 1 is a perspective view of the complete improved film winder provided with a circular light barrier which is temporarily removed from the supply or bulk roll compartment. This figure also shows the cover of the housing in a removed position and with the underneath side of the cover exposed to view;

Figure 2 is a fragmentary sectional view taken at one edge of the improved winder and through the housing cover to show the film supporting ridges thereon and their relation with respect to the film;

Figure 3 is a fragmentary sectional view of the cassette end of the winder with the film in place and in the act of loading the cassette;

Figure 4 is a sectional view drawn somewhat smaller than the other views and taken through the supply roll compartment with the light barrier in place and showing the stops which limit the circular movement of the barrier;

Figure 5 is a sectional view of the entire winder except for the extreme left hand end and showing a typical cassette on which film is being wound; also illustrating the ratchet wheel for operating the counter which indicates the length of film wound. This figure shows the slot or opening in the circular light barrier effectively open to permit the ready movement of the film;

Figure 6 is a view somewhat similar to Figure 5 but showing the slot in the light barrier effectively closed when the cover of the housing has been removed for the insertion or removal of a cassette;

Figure 7 is a small plan view in diagram of the winder showing the relative positions of the interlocking lever and the light barrier when the housing cover of the winder is in place.

Figure 8 is a view showing the change in the relative positions of the interlocking lever and the light barrier when the cover is in position to be removed from the housing;

Figure 9 is a horizontal sectional view of the right hand end of the improved winder, the construction of which has been modified to accommodate a certain form of German make cassette which has a tongue pressed opening to receive the film. This figure also shows an interlocking mechanism for preventing the removal of the housing cover until the opening in the cassette has been closed;

Figure 10 is a vertical sectional view of the film winder shown in Figure 9 illustrating still further the interlocking mechanism between the housing cover and the special form of German make cassette in which the film opening is of the tongue pressed type. This figure also shows the manner in which the spool contained within the cassette can be rotated from the top of the housing rather than from the bottom as in cases of other forms of cassettes;

Figure 11 is a plan view of a modified form of winder but with a portion broken away to expose the interior to illustrate the interlocking mechanism between the opening in the light barrier of the bulk film supply compartment and the opening in the cassette in order to prevent the removal of the housing cover until each of these openings has been closed;

Figure 12 is a fragmentary sectional view showing a detail of the interlocking mechanism illustrated in Figure 11, while Figure 13 illustrates in section the interconnecting gear mechanism which constitutes the interlock feature of Figure 11;

Figure 14 is a cross-sectional view of a typical rotatable shutter form of cassette which may be provided in the winder shown in Figures 11, 12 and 13. The section is taken along line 14—14 of Figure 13.

Referring more particularly to Figure 1, the improved winder comprises an elongated housing generally designated with a reference character 1, and made preferably of a moldable substance such as a phenolic condensation product such as Bakelite, etc. The housing is provided at one end with a large circular compartment 2 which accommodates the bulk film supply roll and a smaller compartment at the other end indicated at 3 containing the film receiving cartridge or cassette. The compartment 2 is closed at the bottom, as indicated at 4, but open at the top to receive a light barrier indicated generally at 5. This barrier may be made of the same material as the housing 1 and consists of a circular wall portion 6 having a relatively wide vertically extending slot 7 and terminating at the top in a circular lid 8. The lid is provided with a flange 9 the under side of which abuts the top of the compartment 2 when the light barrier is in place. There is a circular hole 10 extending through the lid 8, this hole being in line with a column or rod 11 which extends upwardly from the bottom 4 of the circular compartment 2.

The upper end of the column 11 has a threaded opening 12 to receive a knurled headed screw 13, the arrangement being such that when the barrier is placed in position within the circular housing and the screw 13 is loosened the barrier is permitted to rotate on the column axis. The bottom 4 of the circular compartment is provided with a pair of spaced stops 14a (Figures 1 and 4) which cooperate with a pair of shoulders 14 at the lower edge of the light barrier to limit the circular movement of the barrier.

The compartment 3 of the housing is provided with top and bottom side pieces 15, the upper one of which (Figure 3) has an opening 16 for receiving a knurled knob generally indicated as 17. This side piece is also provided with a second opening for receiving a knurled counter or indicator knob 18 (Figure 1) having an index 19. The lower side piece 15 is provided with an opening 20 (Figure 3) in line with the opening 16 for receiving a knurled knob 21 provided with a pair of prongs 22 which fit about a central plate projection 23 secured to the spool 24 of any standard form of cassette. This spool is contained within a cylindrical housing 27, and the arrangement is such that as the knob 21 is rotated clockwise, as seen in Figure 3, the spool 24 and its surrounding cylinder 27 is correspondingly rotated. The cylinder cover 27 terminates at the top and bottom in re-entrant portions 28 the lower portion of which is adapted to be seated within a circular restraining ridge 29 formed in the compartment 3.

In case the cassette such as described is of the standard type, for example, the Eastman, Agfa, Dupont, etc., in which no light shutter is employed but simply a velvet padded light trap, the upper end of the spool 24 may be supported from the opening 16 in the side piece 15 in any suitable and well-known manner simply to permit rotation of the spool when the knurled knob 21 is rotated. It will be understood in this connection that the end of the film is introduced into the cassette by removing the spool from the housing 27 and attaching the film to the spool after which the cover is replaced. One of the re-entrant ends 28 is made removable for the loading operation and the film is pressed through the light trap of the housing 27. The knob 21 upon rotation will then serve to wind film on the spool, this film being introduced from the bulk supply roll as will be described presently.

When the film is taken from the supply roll contained in the compartment 2, access to the cassette compartment 3 must be had in order to insert and remove the cartridge. For this purpose, there is provided a removable cover 30 which is provided at one end with a tongue indicated at 31 (Figure 1) fitting into a groove in the housing 3 and detachably secured to the latter by means of a thumb screw 32. The underneath side of the cover which is that shown in Figure 1 is provided with a number of parallelly aligned inwardly extending ridges 33 (Figure 2). The two outermost ridges have a slightly greater height than the remaining ridges for the purpose of lightly contacting the upper surface of the motion picture film. This light contact and the restricted area thereof prevents scratching of the film and at the same time the ridges hold the film in flattened condition as it moves through the winder.

There is a sponge rubber contact piece 34 secured to the underside of the cover 30 and the purpose of which is to bear against the cylinder cover 27 of the cassette in order to cause the latter to maintain its position within the housing.

The bulk film obtained from the supply houses usually comes wound on a wooden spool which has an opening of the size to fit about the column 11. This bulk supply roll may comprise many feet of film from which it is desired to unwind a predetermined length of film and to wind that length onto the spool of the cassette 27.

The cylinder light barrier 6 preferably has a diameter such as snugly to fit within the housing 2 so that the wall of the barrier is interposed between the film supply roll and the interior surface of the compartment 2. The slot 7 of the barrier 6 has such a position with respect to the compartment 2 as to permit the film from the supply roll to be taken through the slot on its way to the cassette. By providing a slot of wide dimension the film makes no contact with any of the edges of the barrier 6 and thus scratches are prevented. In view of the considerable width of the slot, it is apparent that if the cover 30 could be removed from the housing light would enter through the slot and fog perhaps many feet of the film on the supply roll.

In accordance with one of the features of my invention there is provided an interlock between the cover 30 and the opening 7 of the light barrier in such a way that the cover cannot be removed from the housing until the slot has been effectively closed to light. This interlocking feature consists essentially of a lever 35 pivoted to the upper side piece 15 of the housing and having portions which extend in the horizontal and vertical directions, as seen in Figure 1. The horizonal portion has generally a circular configuration, as indicated at 36, provided with an inwardly extending arcuate slot 37 of a radius which conforms to the radius of the lip 9 of the light barrier device 5. This lip is provided with an inwardly extending slot 38 which is adapted to receive the circular portion of the lever 35 when the latter is swung clockwise as seen in Figure 1. However, as the lever is swung counterclockwise the arcuate depression 37 is cut back sufficiently to permit the outer circular boundary of the lip 9 freely to pass.

The vertical portion of the lever 35 terminates in a hook 39 of a length such that when the lever is rotated counter-clockwise (Figure 1) the hook will prevent the removal of the cover 30 from the housing. When the lever 35 is rotated clockwise (Figure 1) so that the circular portion 36 can be caused to enter the arcuate slot 38, the hook 39 will be moved to its extreme left hand position and offers no obstruction to the removal of the cover 30.

A comparison between Figures 5 and 6 will show that during the winding operation the slot 7 is positioned to the right of the vertical axis drawn through the film supply roll compartment so that absolutely no contact is made between the film indicated at 40 and the edges of the slot. Under these conditions the lever 35 will take the position shown in Figure 7 in which the arcuate slot 38 is positioned horizontally from the center of the film supply roll. It has been explained that the light barrier 5 can be moved only to a limited extent due to the stops 14ª (Figure 4) and the corresponding shoulders 14 (Figure 1) on the light barrier.

In Figure 7 the light barrier has been rotated in the counter-clockwise direction as far as possible. In order to permit the lip 9 of the light barrier to rotate it is necessary to move the lever 35 counter-clockwise so as to bring the arcuate slot 37 in alignment with the outermost periphery of the lip 9. It has been already pointed out that when the lever has this particular position the hook 39 will clamp itself around the cover, thus preventing the removal of the cover from the housing. However, when the lever 35 is rotated clockwise and the lip 9 of the light barrier is also rotated clockwise until the circular portion 36 slips into the arcuate slot 38, the hook 39 will be moved to its extreme left hand position, as seen in Figure 8, thus unclamping the cover.

When the lip 9 of the light barrier has been rotated clockwise as far as it will go, which is the position shown in Figure 8, the slot 7 will also have been moved clockwise to the position shown in Figure 6. Under these conditions, the solid portion, i. e. the unslotted portion, of the wall will be in juxtaposition to the housing 2 (Figure 6). The latter is provided with an opening 42 in the wall between the supply roll compartment and the smaller compartment 3 so that as the wall 6 of the light barrier is moved to its new position, this wall will completely close off the opening 42. Consequently no harmful fogging effects will be produced when the cover 30 is removed to insert a cassette in the winder.

In order to assure that not even the slightest amount of light can pass through the opening 42 and through the small space which inevitably exists between the wall 6 and the housing 2 when the light barrier is in the closed position (Figure 6) a small velvet pad 43 may be provided at the place indicated to provide a light-excluding cushion effect.

The procedure of loading a cassette of the ordinary Eastman type is as follows: Unloosen the screw 13 and rotate the lid 8 of the light barrier clockwise until it stops, then move the interlock lever 35 away from the cover 30, taking off the cover 30 by removing the screw 32. The next step is to go into a dark room with a film winder (minus the cover 30) and a can of bulk film, remove the film from the can and lift the lid 8 off the film winder depositing the bulk film in the chamber provided. The film is placed so that it unrolls counterclockwise when viewed from the top. A predetermined length of film is then pulled through the opening 42 after which the lid 8 is replaced and rotated until the slot 38 registers with the circular portion 36 of the lever. This closes the opening 42 by causing the wall portion 6 to completely bridge the opening, as is shown in Figure 6. The film winder may now be removed from the dark room since no light whatsoever can penetrate the large compartment 2. The next step is to insert the free end of the film into the cassette or cartridge. This is done by removing the cylinder cover 27 of the cassette and inserting the end of the film into an opening provided on the wooden spool of the standard cartridge. The cover 27 is then applied to the spool, slipping the film through the slot in the cover which is usually provided with a felt or velvet padded light trap. The cartridge or cassette is then ready to be placed in the winder between the bearings provided at the upper and lower side pieces 15. The plate 23 of the spool will be accessible from the lower side piece 15 from the opening 20 so that by inserting the knurled key 21 and turning the latter, the spool within the cassette can be rotated.

After the latter has been placed in position in the winder and the knob 23 turned slightly to assure that everything is satisfactory, the cover 30 may be replaced by fitting its tongue 31 into the groove within the housing and applying the screw 32. The lever 35 is then rotated counter-clockwise to press the hook 39 into clamping position and to bring the arcuate slot 37 in line with the outer edge of the lip 9. The lid 8 can then be rotated counter-clockwise as far as it will go which in effect brings the slot 7 into register with the opening 42 which is the position shown in Figures 5 and 7. Inasmuch as the cover 30 has been placed in position, no light can be transmitted through the aligned openings 7 and 42. It is then only necessary to turn the knob 21 until sufficient film has been wound on the cassette. A convenient method of determining the length of film so wound will be described presently.

To remove the loaded cassette, assuming that it is provided with a self-closing light trap, it is simply necessary to rotate the lid 8 in a clockwise direction as far as it will go and until the arcuate slot 38 coincides with the circular portion of the lever 35. In this position the opening 42 in the housing is completely closed off by the wall portion 6 of the light barrier, as shown in Figure 6. The lever 35 may now be rotated clockwise causing the hook 39 to be moved to its extreme left hand position and permitting the cover 30 to be removed. The film external to the cassette can be cut and the cassette removed by simply pulling out the knurled key 21 and disengaging the spool from its centers in the winder. The latter is then ready for the insertion of an empty cassette to be loaded.

In order to determine the length of film which has been wound on the cassette, I have provided a sprocket wheel 45 with a hub 46 rotatably mounted in any suitable manner on the top of a column 47 (Figure 2) which extends upwardly from the lower side piece. The hub is provided with a pin 48 which constitutes a pawl for a ratchet wheel 49 mounted on a circular column 50 which rises up from the lower side piece 15. The arrangement is such that as the sprocket 45 makes a complete revolution the pin 48 will move the ratchet wheel 49 clockwise, as seen from the top of the winder (Figures 5 and 6). In order that the ratchet wheel 49 will maintain the last position in which it was pressed by the pin 48 during each complete revolution of the pin there may be provided a spring 51 which is anchored to the winder in any suitable manner.

The shaft 52 which carries the ratchet wheel is extended through the upper side piece 15 and is provided with a knurled knob 18 having an index 19. The film 49 is usually provided at one or both edges with perforations 53, one line of these perforations being adapted to fit over the teeth of the sprocket 45 as the film is moving toward the cassette. Consequently, when the spool of the cassette is rotated, the film will rotate the sprocket wheel and for each revolution of the sprocket will move the ratchet wheel one tooth to cause suitable indications on the index. The travel of the latter may be graduated in exposures or feet of film as desired, depending upon the relative dimensions of the sprocket and the ratchet wheel.

In order that the perforations in the film shall register squarely with the teeth of the sprocket wheel 45, it is necessary that good support be given to the film at the point of contact. According to another feature of my invention this support is provided by undercutting the column 40 over its entire length except at the bottom where a shoulder is left indicated at 53' (Figure 2), this shoulder being positioned just slightly above the lower outer ridge 33 of the cover. The hub 46 of the sprocket wheel is given a slightly larger diameter than the undercut column 47, the arrangement being such that the film 40 bears against the hub 46 and the column 47 only at its extreme edges and the two outer ridges 33 of the cover hold the film in this position. Scratches on the film are thereby avoided since the useful width of the film, i. e. the portion between the perforations does not touch any surface on its way to the cassette.

While I have described the structure and operation of the improved film winder from the standpoint of loading cassettes provided with cloth or velvet lined light traps, the improved film winder can be used equally well with those cartridges of the Leica and Contax types which have rotatable light-excluding shutters. Figure 14 is a cross section through a cartridge of these two types. The spool is indicated at 54 and is provided with a slot 55 into which is inserted the tongue of an actuating key. The film of a loaded cartridge is designated 56 and surrounding the roll there is a rotatable barrier or shutter element 57 slidably mounted within a cylinder 58. The cylinder 58 is provided with an opening 59 and the shutter 57 also has an opening 60 which may be brought into alignment by simply rotating the shutter. When these openings 59 and 60 are in register, the interior of the cassette is exposed for winding or unwinding purposes. On the other hand, when the shutter 57 is rotated either clockwise or counter-clockwise, as seen in Figure 14, the shutter constitutes a light barrier.

Since it is desirable to exclude light from the interior of the cassette when the cover 30 is removed from the housing, some provision must be made to rotate the shutter with respect to the outer cylinder or barrel at the proper time. For this purpose the shutter is provided with a horizontal circular plate 61 (Figure 13), which extends over the edge of the cylinder 58 and is provided with an upstanding projection 62. This projection is so arranged in cassettes of the type mentioned that the projection 62 can be rotated to turn the shutter 57 only when it is depressed against a suitably mounted spring.

In Figure 3 there is shown a mechanism extending to the outside of the housing for both depressing and rotating the shutter projection 62 in order to close the shutter when the cover 30 is to be removed. The opening 16 receives a rod 64 to which is screwed the knurled knob 17. The latter has an overhanging edge indicated at 65 which is provided with a circular groove 66. The rod 64 is arranged concentrically with the opening 16 and held in that position by a ring 67 which is secured to the upper top piece 15 and has an upwardly extending circular wall portion 68 adapted slidably to fit within the groove 66. The lower end of the rod 64 has integrally secured thereto, a disc shaped member 69 with a downwardly projecting ring portion 70 provided with a radially extending lug 71.

There is a compression spring 72 positioned between the undersurface of the ring 67 and a countersunk portion 73 of the disc shaped member 69. The member 69 is provided with a bore which is adapted to receive the spool 24 of the Leica or Contax cartridge. The arrangement is such that when a cartridge of this type is inserted in the film winder by pulling on the knurled knob against the action of the spring 72 and then releasing the knob, the lug 71 and the ring 70 are caused to depress the shutter projection 62. The shutter may be turned to its open or closed position by rotating the knob 17. The shutter is always maintained closed by suitable actuation of the knob 17 when it is desired to remove the cover 30, thus, light is excluded from the cassette. It will be noted that the knurled knob 17 and its associated elements offers no resistance to the rotation of the spool by the knurled knob 21 but can always be brought into operation by simply applying pressure downwardly on the depressible shutter projection.

The improved film winder is also readily adaptable to those cassettes (usually German) which are provided with a light trap normally closed by a spring biased tongue. This form of cassette is shown in Figures 9 and 10 and, as illustrated, the spool is indicated at 74 on which the film 40 is being wound. The spool is provided at each end with a circular disc 75 and surrounding these discs there is a casing 76 made preferably of a spring metal which merges at the left hand end, as seen in Figure 9, into a rectangular form. Closely following the form of the casing 76 there is a metal protecting cover 77, this cover being made of heavier material than the spring casing 76.

There is an opening indicated at 78 in the cover 77 and the lower end of the cylinder portion of the spring casing 76 is so arranged as to provide a tongue 79 which normally flexes upwardly (Figure 9) to close the opening 78. This tongue extends a short distance beyond the edge of the cover 77. The arrangement is such that in order to expose the opening 78 to the film for winding or loading purposes, it is necessary that the tongue 79 be swung downward temporarily against the cover 77. A pair of spaced projections 80 are provided within the housing 3, the height of these projections being such as to contact with the tongue 79 so as to prevent the cassette from reaching its final position in the housing 3 until the tongue 79 has been sprung against adjacent surface of the cover 77.

There is provided on the cover of the housing 3 a pair of small knobs 81 which have a height such that as the cover 30 is mounted in position by tightening the screw 32, the knobs 81 will press the cover 77 of the cassette against the flexible tongue 79 causing them to abut one another. Thus, in effect the tongue 79 is moved away from the opening 78 to expose the interior of the cassette at its spool to the film. As soon as the cover 30 is removed in order to replace the cassette, the latter immediately springs upwardly from its winding position and allows the tongue 79 to spring inwardly and across the opening 78 in order to exclude light. If desired, velvet or cloth may be glued to those surfaces in the region of the opening 78 which abut to insure a perfect light trap. In Figures 9 and 10 the light trap has been shown in the open position because in both cases the cover 30 is screwed tightly to the housing 1. It is therefore apparent that when using the cassettes of the type shown in Figures 9 and 10 an automatic closure of the slot in the shutter of the cassette through which the film passes while being wound is provided when the cover to the housing is removed. Conversely, the slot is automatically opened when the cover is screwed in place.

It was explained in connection with Figure 3 that when using another type of German-make cassette, namely the Leica or Contax, the shutter of the cassette is closed manually by rotating the knob 17 in order to permit removal of the cover 30 without fogging the film. In Figures 11, 12 and 13, I have illustrated mechanism which automatically opens the shutter of this form of cassette and automatically prevents the opening of the cover 30 until the shutter has been closed. The wall 6 of the light barrier 5 is provided over a limited portion of its periphery with a plurality of teeth 83. These teeth mesh with a gear 84 which may, if desired, be loosely carried on the same column 50 as the ratchet 49. The rod 85 to which the knurled knob 18 and the ratchet wheel 49 are secured may serve as a shaft for the gear. The gear 84 meshes with a pinion 86 which may be loosely mounted on the rod 64 referred to in connection with Figure 3. The pinion 86 is provided at the lower surface with downwardly extending teeth or projections 87 which have forwardly acting vertical surfaces at one end and inclined surfaces at the other end, as seen in Figure 12. There is a compression spring 88 inserted between the pinion 86 and the underside of the disc 67, similar to Figure 3. The teeth 87 have a depth such that when the pinion is in its lowermost position the blunt or vertical surface of the teeth will strike the shutter projection 62 and when the pinion 86 is rotated the shutter will be similarly rotated into a closed position.

In the Leica and Contax form of cassette the projection 62 need be depressed only to open the shutter, but after the shutter has been opened the shutter can be closed by simply rotating the projection at which time the shutter snaps into its closed position requiring a depressing action on the projection to again open the shutter.

Assume that it is desired to roll a Leica or Contax form of cartridge and the compartment 2 of the winder contains bulk film with a short piece extending into the smaller compartment 3. The shutter projection 62 of the cassette is first depressed to open the shutter for the introduction of the end of the film into the cassette. The latter is then placed within the housing 3 and after the knurled knob 21 is inserted at the bottom side piece 15, the cover 30 is placed in a position on the housing 3. It will be understood that inasmuch as the light barrier wall 6 has the position shown in Figure 6, the hook 33 is at its extreme left hand position permitting the cover 30 to be applied. The lever 35 is then moved counter-clockwise (Figure 1) thus clamping the cover to the housing and the lid 8 is simultaneously rotated, thus bringing the slot 7 of the film supply roll compartment into register with the opening 42. As the lid is moved counter-clockwise, the gear 84 is rotated clockwise and the gear 86 is rotated counter-clockwise. The teeth 87 are given a corresponding movement, but on account of the fact that the teeth have inclined surfaces where they strike the shutter projection 62 no rotation of the projection is produced but instead the teeth are permitted to ride up over the projection causing the pinion 86 to compress the spring 88. It will be understood in this connection that the shutter in the cassette had already been opened at the time it was inserted so that no further shutter opening operation is necessary at this time.

However, if it were desired to remove the cover 30 in order to take out the loaded cassette the lid 8 is given a clockwise rotation, as explained hereinbefore, to close the opening 42 and this movement causes a clockwise rotation of the teeth on the pinion 86. Under these circumstances the blunt surfaces of one of the teeth 87 will come into contact with the shutter projection 62 automatically closing the shutter. In view of the fact that the lid has been moved clockwise as far as it can go so that the light barrier takes the position shown in Figure 6, the lever 35 can now be swung clockwise to release its clamping effect on the cover. Thus, the loaded cassette can be removed since the shutter is closed and no fogging effects are introduced into the film of the cassette or into the film of the supply roll.

It is apparent that the entire mechanism by which the opening and closing of the shutters in the supply roll compartment and in a cassette of the Leica and Contax type may be contained entirely interiorly of the housing since it requires only the gear 84 and the pinion 86. However, in Figure 13 there is shown a knurled knob 17 secured to a rod 64 which has an opening 89 which is adapted to receive a robot key for rotating the spools of those cassettes which are drivable from the upper rather than the lower ends. Consequently, the knob 17 in Figure 13 is provided solely for actuating the spool of certain forms of cassettes and not for the purpose of opening or closing the shutter of these cassettes.

A cassette requiring a spool drive in which a robot key is applied to the upper end instead of the lower end as in the case of standard types of cassette is shown in Figure 10. In this case, the knurled knob 17 serves to rotate the spool instead of actuating a rotatable shutter because, as explained hereinbefore, the cassette of Figure 10 is provided with a spring tongue light trap which is controlled solely by the removal and placement of the cover 30.

Consequently, in the event that the cassettes which have only a bottom drive, such as shown in Figure 3, are employed in connection with the automatic opening and closing mechanism illustrated in Figure 13, there would be no apparatus external to the housing directly above the pinion 86, but all of this mechanism would be contained within the housing.

It is apparent that the teeth 83 on the light barrier wall 6 may be molded at the same time the wall is fabricated. Also, the gear 84 and pinion 86 may be made of molded material so that the entire mechanism shown in Figures 11, 12 and 13 with the exception of the cassettes themselves may be made preferably of a phenolic condensation product, such as Bakelite, etc.

It will be understood that I desire to comprehend within my invention such modifications as may come within the scope of the claims and the invention.

Having thus fully described my invention, what I claim as new and desire to secure by Letters Patent, is:

1. A photographic film-dispensing apparatus comprising a casing formed of two compartments, one of said compartments being adapted to contain a roll of film and the other being adapted to contain a cartridge for receiving predetermined lengths of said film, an opening from one compartment to the other to permit the film to be moved from said roll to said cartridge, a movable light barrier for said opening, said cartridge-receiving compartment having an opening through which the cartridge may be inserted therein, a removable cover for the last-mentioned opening, a latch for said cover, and means for preventing operation of said latch when the light barrier is in a position to expose the opening in the film-roll-receiving compartment.

2. A photographic film-dispensing apparatus comprising a casing formed of two compartments, one of which is adapted to receive a supply roll of film and the other is adapted to receive a film cartridge, a movable light barrier in said supply-roll-receiving compartment, openings in said compartment and in the light barrier to permit the film to be moved from the supply roll to the cartridge, said openings being adapted to be brought into register when the light barrier is moved with respect to its compartment, said cartridge-receiving compartment having an opening through which the cartridge may be inserted therein, a cover for the opening in said last-mentioned compartment, means for securing said cover to the compartment, and means for preventing the operation of said cover-securing means when the openings in the supply-roll-receiving compartment and in the light barrier are in register.

3. A photographic film-dispensing apparatus comprising a casing formed of two compartments, one of which is adapted to receive a supply roll of film and the other is adapted to receive a film cartridge, the supply-roll-receiving compartment being of cylindrical shape and provided with a movable cylindrical light barrier, means on the exterior of the casing for moving said barrier, rectangular openings in said cylindrical compartment and light barrier to permit the film to be moved from the supply roll to the cartridge, said openings being adapted to be brought into register when the light barrier is moved with respect to the cylindrical compartment, said cartridge-receiving compartment having an opening through which the cartridge may be inserted therein, a cover for the last-mentioned opening, means for securing said cover to its compartment, and means for preventing the operation of said cover-securing means when the rectangular openings in the supply-roll-receiving compartment and in the light barrier are in register.

4. A photographic film-dispensing apparatus comprising a casing formed of two compartments, one of which is adapted to receive a supply roll of film and the other is adapted to receive a film cartridge, a movable light barrier in said supply-roll-receiving compartment, openings in said compartment and in the light barrier to permit the film to be moved from the supply roll to the cartridge, said openings being adapted to be brought into register when the light barrier is moved with respect to its compartment, said cartridge-receiving compartment having an opening through which the cartridge may be inserted therein, a removable cover for the opening in said last-mentioned compartment, and means for preventing the removal of said cover when the openings in the supply-roll-receiving compartment and in the light barrier are in register, said last-mentioned means comprising a lever pivotally mounted on said casing, one end of the lever being provided with a hook which clamps over said cover to prevent removal thereof when the light barrier has been rotated to a position that its opening is in register with the opening of the supply-roll-receiving compartment.

5. A photographic film-dispensing apparatus comprising a casing formed of two compartments, one of which is adapted to receive a supply roll of film and the other is adapted to receive a film cartridge, a movable light barrier in said supply-roll-receiving compartment, said light barrier being provided with a lip positioned on the exterior of the casing for moving the barrier, a slot in said lip, said cartridge-receiving compartment having an opening through which the cartridge may be inserted therein, a removable cover for the last-mentioned opening, and means including a latch for preventing the removal of said cover when the openings in the supply-roll-receiving compartment and in the light barrier are in register, said latch being positioned on the exterior of the casing and adapted to be unlocked only when the latch is inserted into the slot of said lip when the light barrier has been moved to a position such that its opening is out of register with the opening in the supply-roll-receiving compartment.

6. A photographic film-dispensing apparatus comprising a casing formed of two compartments, one of which is adapted to receive a supply roll of film and the other is adapted to receive a film cartridge, a movable light barrier in said supply-roll-receiving compartment, openings in said compartment and in the light barrier to permit the film to be moved from the supply roll to the cartridge, said openings being adapted to be brought into register when the light barrier is moved with respect to its compartment, said cartridge-receiving compartment having an opening through which the cartridge may be inserted therein, a cover for the opening in said last-mentioned compartment, a latch for said cover, means including said latch, and a latch-receiving slot in said light barrier for preventing movement of the light barrier to a position which would bring the openings in the light barrier and in the supply-roll-compartment into register until the latch has been moved to lock said cover in position.

7. A photographic film-dispensing apparatus comprising a casing formed of two compartments, one of which is adapted to receive a supply roll of film and the other is adapted to receive a film cartridge, a movable light barrier in said supply-roll-receiving compartment, openings in said compartment and in the light barrier to permit the film to be moved from the supply roll to the cartridge, said openings being adapted to be brought into register when the light barrier is moved with respect to its compartment, said cartridge-receiving compartment having an opening through which the cartridge may be inserted therein, a cover for the opening in said last-mentioned compartment, a latch for securing said cover, and means for interlocking said light barrier with said latch such that when the latch is moved away from said cover the light barrier must be in such a position as to cause the openings in the roll-supply compartment and in the light barrier to fall out of register.

8. A photographic film-dispensing apparatus comprising a casing formed of two compartments, one of which is adapted to receive a supply roll of film and the other is adapted to receive a film cartridge, a movable light barrier in said supply-roll-receiving compartment, openings in said compartment and in the light barrier to permit the film to be moved from the supply roll to the cartridge, said openings being adapted to be brought into register when the light barrier is moved with respect to its compartment, said cartridge-receiving compartment having an opening through which the cartridge may be inserted therein, a cover for the opening in said last-mentioned compartment, means for automatically preventing the removal of the cover until the light barrier has been moved to such a position that the opening in the barrier is out of register with the opening in the supply-roll compartment, said means including a latch which is interlocked with the light barrier at all positions of the light barrier except one position where the opening in the barrier is out of register with the opening in the supply-roll compartment.

9. A photographic film-dispensing apparatus comprising a casing formed of two compartments, one of which is adapted to receive a rotatable supply roll of film and the other is adapted to receive a film camera magazine having a shutter to close the spool access opening therein, a movable light barrier in the supply-roll-receiving compartment, openings in said barrier and in its compartment which are adapted to be brought into register when the barrier is moved with respect to its compartment to permit film to be moved from said roll to said magazine, said magazine-receiving compartment having an opening through which the magazine may be inserted therein, a removable cover for said last-mentioned opening, and means for mechanically connecting the rotatable light barrier with the rotatable shutter in the magazine in order to open the shutter when the barrier has been moved to a position such that its opening is in register with the opening in the supply-roll-receiving compartment.

10. A photographic film-dispensing apparatus comprising a casing formed of two compartments, one of said compartments being adapted to contain a roll of film and the other being adapted to contain a film camera magazine for receiving predetermined lengths of film, an opening from one compartment to the other to permit the film to be moved from said roll to said magazine, movable closure means in the film-roll-receiving compartment for said opening, said magazine having a rotatable shutter to close the spool access opening therein, and means including a train of gears for opening the shutter of said magazine simultaneously with the moving of said closure means in the film-roll-receiving compartment to uncover said opening therein.

11. A photographic film-dispensing apparatus comprising a casing formed of two compartments, one of said compartments being adapted to contain a roll of film and the other being adapted to contain a film camera magazine for receiving predetermined lengths of film, an opening from one compartment to the other to permit the film to be moved from said roll to said magazine, movable closure means in the film-roll-receiving compartment for said opening, said magazine having a rotatable shutter to close the spool access opening therein, and means including a train of gears for opening the shutter of said magazine simultaneously with the moving of said closure means in the film-roll-receiving compartment to uncover said opening therein said last-mentioned means also serving to rotate the shutter in the magazine to its closed position when the opening in the film-roll-receiving compartment is closed by said closure means.

12. A photographic film-dispensing apparatus comprising a casing formed of two compartments, one of said compartments being adapted to contain a supply roll of film and the other being adapted to contain a film magazine provided with a rotatable shutter to close the spool access opening therein, a movable light barrier in said film-roll-receiving compartment, an opening from one compartment to the other to permit the film to be moved from the supply roll to the magazine, said magazine-receiving compartment having an opening through which the magazine may be inserted therein, a cover for the last-mentioned opening, a latch for said cover, means for preventing the operation of said latch when the light barrier is in a position to uncover the opening in the film-roll-receiving compartment, and a mechanical connection between said light barrier and the shutter in said magazine, said mechanical connection being such that when the opening in the film-roll-receiving compartment is exposed the shutter of the magazine is moved to a position to open the spool access opening therein in order to receive film from the supply roll of film.

WALTER W. BOES.